United States Patent
Feng (10) Patent No.: US 11,648,522 B2
(45) Date of Patent: *May 16, 2023

(54) POLYUREA CAPSULES CROSS-LINKED WITH CHITOSAN

(71) Applicant: Encapsys, LLC, Appleton, WI (US)

(72) Inventor: Linsheng Feng, Menasha, WI (US)

(73) Assignee: Encapsys, LLC, Appleton, WI (US)

( * ) Notice: Subject to any disclaimer, the term of this patent is extended or adjusted under 35 U.S.C. 154(b) by 129 days.

This patent is subject to a terminal disclaimer.

(21) Appl. No.: 17/175,090

(22) Filed: Feb. 12, 2021

(65) Prior Publication Data

US 2021/0252469 A1   Aug. 19, 2021

Related U.S. Application Data

(60) Provisional application No. 63/005,574, filed on Apr. 6, 2020, provisional application No. 62/976,471, filed on Feb. 14, 2020.

(51) Int. Cl.

| | | |
|---|---|---|
| C11D 3/00 | (2006.01) | |
| C11D 3/50 | (2006.01) | |
| C11D 11/00 | (2006.01) | |
| C11D 11/02 | (2006.01) | |
| B01J 13/14 | (2006.01) | |
| B01J 13/16 | (2006.01) | |
| C11B 9/00 | (2006.01) | |

(52) U.S. Cl.
CPC .............. B01J 13/16 (2013.01); C11B 9/00 (2013.01); C11D 3/0015 (2013.01); C11D 3/505 (2013.01)

(58) Field of Classification Search
CPC ............ A61K 2039/55555; A61K 8/11; A61K 8/736; C11D 17/0039; C11D 3/505; C11D 3/227; B01J 13/14
See application file for complete search history.

(56) References Cited

U.S. PATENT DOCUMENTS

| | | | |
|---|---|---|---|
| 4,138,362 A | 2/1979 | Vassiliades et al. | |
| 10,537,503 B2 | 1/2020 | Lei et al. | |
| 2004/0219268 A1* | 11/2004 | Hogoy ................. | A23K 20/163 264/4.1 |
| 2005/0043209 A1* | 2/2005 | Schmiedel ............ | A61L 9/042 512/1 |
| 2005/0123614 A1* | 6/2005 | Kim ...................... | A61K 9/1658 424/489 |
| 2013/0330292 A1 | 12/2013 | Lei et al. | |
| 2017/0348204 A1* | 12/2017 | Speaker ............... | A61K 8/891 |
| 2018/0078507 A1* | 3/2018 | David .................. | A61K 9/0095 |
| 2021/0252469 A1* | 8/2021 | Feng .................... | B01J 13/16 |
| 2021/0339217 A1* | 11/2021 | Feng ................... | C11D 17/0039 |

FOREIGN PATENT DOCUMENTS

| | | | |
|---|---|---|---|
| KR | 100523479 B1 | * | 10/2005 |
| WO | WO 2017/218880 A1 | * | 12/2017 |
| WO | WO 2018053356 A1 | * | 3/2018 |
| WO | WO 2019063515 A1 | * | 4/2019 |
| WO | WO 2019/179939 A1 | * | 9/2019 |
| WO | WO 2020/131890 A1 | * | 6/2020 |
| WO | PCT/IB2021/000098 | | 8/2022 |

OTHER PUBLICATIONS

CN 102258967-A, Yuan et al., published on Nov. 30, 2011.*
Rojas, John, Juliana Madrigal, and Juliana Ortiz. "Effect of acid hydrolysis on tableting properties of chitin obtained from shrimp heads." Tropical Journal of Pharmaceutical Research 14.7 (2015): 1137-1144.
Younes, Islem, and Marguerite Rinaudo. "Chitin and chitosan preparation from marine sources. Structure, properties and applications." Marine drugs 13.3 (2015): 1133-1174.
Kasaai, Mohammad Reza, Joseph Arul, and Gérard Charlet. "Fragmentation of chitosan by acids." The Scientific World Journal 2013 (2013).
Groboillot, A. F., et al. "Membrane formation by interfacial cross—linking of chitosan for microencapsulation of Lactococcus lactis." Biotechnology and bioengineering 42.10 (1993): 1157-1163.
Xie, Kaili, et al. "Monodisperse microcapsules with controlled Interfacial properties generated in microfluidic T-shape junction." CFM 2017-23ème Congrèes Françis de Mécanique. AFM, Maison de la Mécanique, 39/41 rue Louis Blanc-92400 Courbevoie, 201.
Quong D. et al. "Microencapulation within cross-linked chitosan membranes." Chitin Handbook, R.A.A. Muzzarelli and M.G. Peter, eds., European Chitin Society. (1997). 405-410.

* cited by examiner

*Primary Examiner* — Lorna M Douyon
(74) *Attorney, Agent, or Firm* — Benjamin Mieliulis (57) ABSTRACT

An improved process of forming polyurea and chitosan microcapsules encapsulating a benefit agent is described. The process comprises forming a water phase comprising hydrolyzing chitosan in an acidic medium at a pH of 6.5 or less for an extended period and combining with a polyisocyanate. The reaction product of the hydrolyzed chitosan and polyisocyanate yields a microcapsule having improved release characteristics, with enhanced degradation characteristics in OECD test method 301B.

23 Claims, 1 Drawing Sheet

POLYUREA CAPSULES CROSS-LINKED WITH CHITOSAN

CROSS-REFERENCE TO RELATED APPLICATIONS

This application claims the benefit of U.S. Provisional Patent Application No. 63/005,574 filed Apr. 6, 2020, and claims the benefit of U.S. Provisional Patent Application No. 62/976,471 filed Feb. 14, 2020 each of which are incorporated by reference herein in their entirety.

FIELD OF THE INVENTION

This invention relates to capsule manufacturing processes and microcapsules produced by such processes.

DESCRIPTION OF THE RELATED ART

Various processes for microencapsulation, and exemplary methods and materials are set forth in Schwantes (U.S. Pat. No. 6,592,990), Nagai et al. (U.S. Pat. No. 4,708,924), Baker et al. (U.S. Pat. No. 4,166,152), Wojciak (U.S. Pat. No. 4,093,556), Matsukawa et al. (U.S. Pat. No. 3,965,033), Matsukawa (U.S. Pat. No. 3,660,304), Ozono (U.S. Pat. No. 4,588,639), Irgarashi et al. (U.S. Pat. No. 4,610,927), Brown et al. (U.S. Pat. No. 4,552,811), Scher (U.S. Pat. No. 4,285,720), Shioi et al. (U.S. Pat. No. 4,601,863), Kiritani et al. (U.S. Pat. No. 3,886,085), Jahns et al. (U.S. Pat. Nos. 5,596,051 and 5,292,835), Matson (U.S. Pat. No. 3,516,941), Chao (U.S. Pat. No. 6,375,872), Foris et al. (U.S. Pat. Nos. 4,001,140; 4,087,376; 4,089,802 and 4,100,103), Greene et al. (U.S. Pat. Nos. 2,800,458; 2,800,457 and 2,730,456), Clark (U.S. Pat. No. 6,531,156), Saeki et al. (U.S. Pat. Nos. 4,251,386 and 4,356,109), Hoshi et al. (U.S. Pat. No. 4,221,710), Hayford (U.S. Pat. No. 4,444,699), Hasler et al. (U.S. Pat. No. 5,105,823), Stevens (U.S. Pat. No. 4,197,346), Riecke (U.S. Pat. No. 4,622,267), Greiner et al. (U.S. Pat. No. 4,547,429), and Tice et al. (U.S. Pat. No. 5,407,609), among others and as taught by Herbig in the chapter entitled "Microencapsulation" in Kirk-Othmer Encyclopedia of Chemical Technology, V. 16, pages 438-463.

Each patent described throughout this application is incorporated herein by reference to the extent each provides guidance regarding microencapsulation processes and materials.

Jabs et al., U.S. Pat. No. 4,847,152 teaches microcapsules with polyurea walls. The wall is the reaction product of an aromatic isocyanate with an isocyanate reactive group. The isocyanate reactive group can include di- and polyamines such as N-hydroxyethylethylenediamine, ethylene-1,2-diamine.

Hotz et al., U.S. Pat. Pub. 2013/0089590 teaches a fragrance microcapsule with a polyurea wall. The shell in the reaction product of at least two difunctional isocyanates and a difunctional amine.

EP 1693104 Maruyyama discloses microcapsules having a polyurethane or polyurea wall obtained from polycondensation of a polyfunctional isocyanate with a polyfunctional amine.

U.S. Pat. No. 9,816,059 describes a polyurea capsule, the capsule encapsulating an oil core, where the polyurea is a reaction product of a polyfunctional isocyanate and a polyfunctional amine. The polyfunctional amine can include hexamethylene diamine and other amines including chitosan. Chitosan is mentioned as a stabilizing agent, as a polyfunctional amine, as a coating, without any guidance or example how to work with this difficult to handle material.

Chitosan is a polysaccharide and can be a difficult material to utilize in microencapsulation processes. Chitosan is generally insoluble in water above pH 7, and below about pH 6.5 is cationic. Chitosan is soluble in low pH acidic solutions such as hydrochloric acid, lactic acid, propionic acid, succinic acid, acetic acid, citric acid and phosphoric acid, forming a hard to handle viscous solution but generally insoluble in water above pH 7. At pH values below 4, the amino groups of chitosan promote electrostatic repulsion and the polymer swells. In acid solution the free amine groups are believed to form hydrogen bonds with adjacent oxygen groups.

The dissolved polysaccharide has positive charged $-NH_3^+$ groups and adheres to anionic surfaces. Chitosan forms aggregates with polyanions and chelates heavy metals.

A need exists in the art for polyurea type microcapsules having improved properties in terms of better deposition efficiency, lower leakage measured as lower free oil, and having cationic charge at pH less than about 7. If chitosan can be adapted to be useful as a solubilized cross-linker, an improved polyurea wall material becomes possible.

The present invention overcomes the above deficiencies of the present art by teaching an improved polyurea microcapsule cross-linked with chitosan. The chitosan is hydrolyzed to enable the chitosan to be soluble even at pH above 5, enabling its use in microencapsulation processes such as interfacial encapsulation.

Although the art generally mentions chitosan as a possible component in forming wall material in microencapsulation, there is little teaching as how to practically utilize this difficult to handle material.

Chitosan is generally insoluble in water, alkali and most organic solvents. Even under acidic low pH condition, solubility is generally less than 2 wt %. The composition is viscous, difficult to handle and requires considerable dilution. Chitosan concentrations less than 2 wt % make the material unsuitable for interfacial microencapsulation.

Chitosan is insoluble at higher pH and capsule formation under capsule forming conditions usually involves pH of 7 or 9 or even more alkaline conditions, presenting a situation where chitosan is an essentially insoluble viscous mass unsuitable for interfacial encapsulation.

A need exists for chitosan polyurea compositions at higher concentrations of chitosan which overcome the technical challenges of working with chitosan, and provide a useful concentration greater than 2 wt % in the water phase to enable successful chitosan urea polymer shell formation.

Although chitosan is mentioned as a cross-linker to prepare polyurea capsules such as in Lei et al., 2013/0330292, Lei does not provide any description how to employ chitosan. Chitosan is only soluble at low pH and not soluble at higher pH levels. As pH is increased, chitosan precipitates out of solution. Also, due to its high molecular weight, chitosan is an exceedingly difficult material to use as a cross-linker.

Bulgarelli et al., WO 2019063515 attempts to overcome the shortcomings of Lei by adding chitosan in solid form. Bulgarelli teaches adding chitosan in the water phase of the emulsion. Unprotonated chitosan is added once a reaction temperature of 80° C. is reached. The claims state the chitosan is added in solid form however, Bulgarelli provides no teaching in an example of how to effect dissolution of the solid chitosan. Chitosan is known to precipitate at alkaline pH's or even pH's exceeding 5.

Polyurea microcapsules have been described for certain applications as advantageous for being free of formaldehyde. Mechanical properties of polyurea systems described to date have not had core retention properties needed in certain challenging applications such as detergents, cleaners, compositions with surfactants, modifiers or other materials tending to negatively influence capsule performance upon prolonged storage. A polyurea chitosan that successfully incorporates chitosan at higher concentrations than heretofore achievable, that does not require additional cross-linkers, or that exhibits lower leakage would be an advance in the art. Improved shelf stability, lower leakage and degradability of such resultant compositions would be beneficial.

SUMMARY OF THE INVENTION

The invention describes a composition and process of forming a population of microcapsules comprising a core and a shell surrounding the core, the process comprising hydrolyzing chitosan in an acidic medium at a pH of 6.5 or less and a temperature of at least 60° C., for at least about one hour. A water phase of the hydrolyzed chitosan is formed by the above process. In addition, an oil phase is formed by dissolving or dispersing at least one benefit agent and at least one polyisocyanate into an oil phase. The benefit agent often can itself be the oil of the oil phase, with the polyisocyanate and benefit agent dissolved together, or optionally with an added oil. An emulsion is formed by mixing, under high shear agitation, the water phase and the oil phase into an excess of the water phase, thereby forming droplets of the oil phase and benefit agent dispersed in the water phase, with the droplets comprising the core of the core-shell microcapsule. Optionally, the pH of the emulsion can be adjusted in a range from pH 2 to pH 6.5. The emulsion is then cured by heating to at least 40° C., or even at least 60° C., for a time sufficient to form a shell at an interface of the droplets with the water phase, the shell is a polyurea comprising the reaction product of the polyisocyanate and hydrolyzed chitosan, the shell surrounding the droplets of the oil phase and benefit agent. For many applications a target droplet size is 0.1 to 80 microns, or even 0.5 to 50 microns.

In a further embodiment, the chitosan is first processed by being hydrolyzed at a pH of less than 6.5, such as a pH of from pH 3 to pH 6, and a temperature of at least 40° C., or even at least 60° C., or even at least 80° C. The hydrolysis time, depending on pH and temperature can be brief, but more typically would be at least one hour, or even for at least 24 hours. By such a processing step, the chitosan in the hydrolyzing step of any of the embodiments is deacetylated to at least 50% or even at least, 75%, or even to at least 80%, or even to at least 85%, or even at least 92%. Desirably, the chitosan in the hydrolyzing step can be depolymerized to an average size of 95 kilodaltons (kDa) or less. The shell formed is a polyurea and the reaction product of polyisocyanate comprising any of isocyanate monomer, oligomer or prepolymer and the hydrolyzed chitosan. The population of microcapsules can comprise an aqueous slurry, or alternatively can be sprayed onto a substrate, or alternatively spray-dried, resulting in a polyurea-chitosan shell with further chitosan deposited on the surface of the formed microcapsules. The unreacted chitosan in the aqueous slurry, if not decanted, can form the further chitosan deposited on the surface of the formed microcapsules.

In one embodiment, the microcapsules are dried and fracture upon drying, thereby releasing the core. This embodiment can find uses in cleaners with fragrance delivery or in agriculture with a benefit agent such as an agricultural active. Dry-pop type capsules, which fracture on drying, are formed through controlling reaction conditions such as controlling cure time and controlling temperature to yield capsules with thinner walls. Higher cure temperatures, along with longer cure times, can promote higher crosslinking density and enhanced brittleness. A thinner wall, such as from 0.1 nanometer to about 300 nanometers, tends to lend itself to becoming brittle on drying. Even in the dry-pop embodiment, the capsules of the invention exhibit lower leakage and better retention of the core in the capsule slurry pre-drying.

In certain embodiments the chitosan in the polyurea shell can be from 21 wt % to 85 wt % or even 90 wt % of the total shell as compared to the amount of polyisocyanate.

In a particular embodiment the process of the invention makes possible a polyurea shell of the core-shell microcapsule having chitosan in the polyurea shell (as compared to the amount of polyisocyanate) at 21 wt % of even greater, more particularly 21 wt % to 90 wt %, or even from 21 wt % to 85 wt %, or even 21 wt % to 75 wt %, or 21 wt % to 55 wt % of the total shell being chitosan.

The chitosan polyurea capsules of the invention in an alternative embodiment make possible forming a reacted polymer shell having a high proportion of chitosan moieties in the polymer. The chitosan to urea weight ratio of the polymer shell can be more than 21 wt % chitosan, or even 21 wt % to 40 wt % chitosan, or even 21 wt % to 60 wt % chitosan, or even 25 wt % to 80 wt % or even to 90 wt % chitosan. Such high weight percent proportions of chitosan in a chitosan polyurea microcapsule make possible an improved capsule system not previously achieved with interfacial type of encapsulation processes. The process and composition of the invention differ from ionic type of processes based on coacervation, as the polymer of the invention is covalently cross-linked with the polyurea constituent monomers, oligomers and prepolymers forming the chitosan polyurea polymer shell.

The composition comprises a core-shell microcapsule, the core comprising a benefit agent, the shell comprising a polyurea resin formed by the reaction of an isocyanate monomer, oligomer or prepolymer and a hydrolyzed chitosan. The chitosan is first hydrolyzed in an acidic medium at a pH of 6.5 or less and a temperature of at least 60° C., for at least one hour.

At low pH, the free amine in chitosan becomes protonated. Chitosan, for purposes hereof, is intended to encompass monomers, oligomers, prepolymers and polymers thereof. When chitosan becomes protonated, conventional understanding would be that chitosan loses the capability of acting as a cross-linker. Chitosan also ceases to act as an emulsifier at low pH, generally of less than pH 4.

A surprising aspect is that capsules formed, according to the invention at low pH, are not only tight capsules with low leakage at high wt % chitosan to urea (or polyisocyanate) ratios, but that such capsules exhibit degradable properties in relatively short time periods. Microcapsules according to the invention are degradable as compared to capsules formed of the same or similar materials under different reaction conditions. Small differences in reaction conditions unexpectedly give rise to encapsulates with significantly different properties. The effect is more pronounced for reactions where in the chitosan hydrolyzation step, the pH is adjusted to around pH 4, or from pH 2-6, or from pH 3-5, but preferably from pH 3.5-5. For capsules made with chitosan that were hydrolyzed at pH 6 or above, the capsule shell showed minimum biodegradation according to the OECD 301 (B) method. However, the capsule shell degraded over 60% in 28 days when the capsule was made with chitosan hydrolyzed at pH 5 or less. Degradability increases as pH of hydrolysis is decreased below pH 6.

Chitosan in the capsule formation process of the invention is first hydrolyzed under acidic conditions (pH 6.5 or less). Optionally the chitosan is hydrolyzed at a pH of from 2 to 6.5, or even from a pH of from 4 to 6. This yields a deacetylated, depolymerized chitosan having water solubility, yet retaining an ability to act as an emulsifier or to replace the need for emulsifier, making additional emulsifiers optional.

The microcapsules according to the invention can be fashioned to have a zeta potential of at least 15 millivolts (mV) at a pH of 4.5, or even at least 40 mV at a pH of 4.5, or even at least 60 mV at a pH of 4.5 Such microcapsules are cationic and useful in applications where deposition onto anionic surfaces is desirable. At higher pH, the capsules can be made nonionic or anionic.

In one embodiment, the ratio of the isocyanate monomer, oligomer or prepolymer to hydrolyzed chitosan is up to 1:10 by weight. Chitosan as a percentage by weight of the polyisocyanate shell can be as little as 21% up to 95% of the shell. Based on total microcapsules weight, the shell can comprise at least 5% by weight of the core-shell microcapsule, or even at least 3% by weight, or even at least 1% by weight of the core-shell microcapsule, and up to 15% by weight of the core-shell microcapsule. The chitosan can have a degree of deacetylation of at least 75% or even at least 85%, or even at least 92%. The core-shell microcapsule, in certain embodiments, can have a ratio of core to shell up to about 99:1, or even 99.5:0.5 on the basis of weight. The benefit agent of the core-shell microcapsules can be selected from a fragrance, an agricultural active, a phase change material and other actives as described herein. The core-shell microcapsules typically have a mean particle size of from 1 to 100 microns. Different particle sizes are obtainable by controlling droplet size during emulsification.

DETAILED DESCRIPTION

The present invention teaches an improved polyurea chitosan microcapsule. In the invention a polyurea microcapsule is successfully prepared by hydrolyzing chitosan in a first step and creating a water solution of the hydrolyzed chitosan. The hydrolyzed chitosan can be utilized at acidic to neutral pH as a cross-linker to form the shell of a core-shell microcapsule. A pH of at least 2 or even 3 or even at least 4 is useful for the water phase to facilitate cross-linking of the hydrolyzed chitosan with the isocyanate monomer.

In the invention, hydrolyzed chitosan is taught used as both crosslinker and emulsifier to prepare polyurea capsules. Hydrolyzing has the benefit of deacetylating and depolymerizing chitosan, thereby solubilizing an otherwise difficult to handle material. In the invention, chitosan is added into water in a jacketed reactor and at pH from 2 or even from 3 to 6.5, adjusted using acid such as concentrated HCl. The chitosan of this mixture is hydrolyzed by heating to elevated temperature, such as 85° C. in 60 minutes, and then held at this temperature from 1 minute to 1440 minutes or longer.

The water phase is then cooled to 25° C. Optionally deacetylating can also be further facilitated or enhanced by enzymes to depolymerize or deacetylate the chitosan. An oil phase is prepared by dissolving an isocyanate such as trimers of xylylene Diisocyanate (XDI) or polymers of methylene diphenyl isocyanate (MDI), in oil at 25° C. Diluents, for example isopropyl myristate, may be used to adjust the hydrophilicity of the oil phase. The oil phase is then added into the water phase and milled at high speed to obtain a targeted size. The emulsion is then cured in one or more heating steps, such as heating to 40° C. in 30 minutes and holding at 40° C. for 60 minutes. Times and temperatures are approximate. The temperature and time are selected to be sufficient to form and cure a shell at the interface of the droplets of the oil phase with the water continuous phase. For example, the emulsion is heated to 85° C. in 60 minutes and then held at 85° C. for 360 minutes to cure the capsules. The slurry is then cooled to room temperature.

The polyisocyanate useful in the invention is to be understood for purposes hereof as isocyanate monomer, isocyanate oligomer, isocyanate prepolymer, or dimer or trimer of an aliphatic or aromatic isocyanate. All such monomers, prepolymers, oligomers, or dimers or trimers of aliphatic or aromatic isocyanates are intended encompassed by the term "polyisocyanate" herein.

The polyisocyanate is an aliphatic or aromatic monomer, oligomer or prepolymer, usefully of two or more isocyanate functional groups. The polyisocyanate, for example, can be selected from aromatic toluene diisocyanate and its derivatives used in wall formation for encapsulates, or aliphatic monomer, oligomer or prepolymer, for example, hexamethylene diisocyanate and dimers or trimers thereof, or 3,3,5-trimethyl-5-isocyanatomethyl-1-isocyanato cyclohexane tetramethylene diisocyanate. The polyisocyanate can be selected from 1,3-diisocyanato-2-methylbenzene, hydrogenated MDI, bis(4-isocyanatocyclohexyl)methane, dicyclohexylmethane-4,4'-diisocyanate, and oligomers and prepolymers thereof. This listing is illustrative and not intended to be limiting of the polyisocyanates useful in the invention.

The polyisocyanates useful in the invention comprise isocyanate monomers, oligomers or prepolymers, or dimers or trimers thereof, having at least two isocyanate groups. Optimal cross-linking can be achieved with polyisocyanates having at least three functional groups.

Polyisocyanates, for purposes of the invention, are understood as encompassing any polyisocyanate having at least two isocyanate groups and comprising an aliphatic of aromatic moiety in the monomer, oligomer or prepolymer. If aromatic, the aromatic moiety can comprise a phenyl, a toluyl, a xylyl, a naphthyl or a diphenyl moiety, more preferably a toluyl or a xylyl moiety. Aromatic polyisocyanates, for purposes hereof, can include diisocyanate derivatives such as biurets and polyisocyanurates. The polyisocyanate, when aromatic, can be, but is not limited to, methylene diphenyl isocyanate, toluene diisocyanate, tetramethylxylidene diisocyanate, polyisocyanurate of toluene diisocyanate (commercially available from Bayer under the tradename Desmodur® RC), trimethylol propane-adduct of toluene diisocyanate (commercially available from Bayer under the tradename Desmodur® L75), or trimethylol propane-adduct of xylylene diisocyanate (commercially available from Mitsui Chemicals under the tradename Takenate® D-110N), naphthalene-1,5-diisocyanate, and phenylene diisocyanate.

Polyisocyanate, which is aliphatic, is understood as a polyisocyanate which does not comprise any aromatic moiety. There is a preference for aromatic polyisocyanate, however, aliphatic polyisocyanates and blends thereof are useful. Aliphatic polyisocyanates include a trimer of hexamethylene diisocyanate, a trimer of isophorone diisocyanate, a trimethylol propane-adduct of hexamethylene diisocyanate (available from Mitsui Chemicals) or a biuret of hexamethylene diisocyanate (commercially available from Bayer under the tradename Desmodur® N 100).

The capsule shell could also be reinforced using additional co-crosslinkers such as multifunctional amines and/or polyamines such as diethylene triamine (DETA), polyethylene imine, and polyvinyl amine.

Core

The microcapsules of the present teaching include a benefit agent which comprises one or more ingredients that are intended to be encapsulated. The benefit agent is selected from a number of different materials such as chromogens and dyes, flavorants, perfumes, sweeteners, fragrances, oils, fats, pigments, cleaning oils, pharmaceuticals, pharmaceutical oils, perfume oils, mold inhibitors, antimicrobial agents, adhesives, phase change materials, scents, fertilizers, nutrients, and herbicides: by way of illustration and without limitation. The benefit agent and oil comprise the core. The core can be a liquid or a solid. With cores that are solid at ambient temperatures, the wall material can usefully enwrap less than the entire core for certain applications where availability of, for example, an agglomerate core is desired on application. Such uses can include scent release, cleaning compositions, emollients, cosmetic delivery and the like. Where the microcapsule core is phase change material, uses can include such encapsulated materials in mattresses, pillows, bedding, textiles, sporting equipment, medical devices, building products, construction products, HVAC, renewable energy, clothing, athletic surfaces, electronics, automotive, aviation, shoes, beauty care, laundry, and solar energy.

The core constitutes the material encapsulated by the microcapsules. Typically, particularly when the core material is a liquid material, the core material is combined with one or more of the compositions from which the internal wall of the microcapsule is formed or solvent for the benefit agent or partitioning modifier. If the core material can function as the oil solvent in the capsules, e.g. acts as the solvent or carrier for either the wall forming materials or benefit agent, it is possible to make the core material the major material encapsulated, or if the carrier itself is the benefit agent, can be the total material encapsulated. Usually however, the benefit agent is from 0.01 to 99 weight percent of the capsule internal contents, preferably 0.01 to about 65 by weight of the capsule internal contents, and more preferably from 0.1 to about 45% by weight of the capsule internal contents. With certain applications, the core material can be effective even at just trace quantities.

Where the benefit agent is not itself sufficient to serve as the oil phase or solvent, particularly for the wall forming materials, the oil phase can comprise a suitable carrier and/or solvent. In this sense, the oil is optional, as the benefit agent itself can at times be the oil. These carriers or solvents are generally an oil, preferably have a boiling point greater than about 80° C. and low volatility and are non-flammable. Though not limited thereto, they preferably comprise one or more esters, preferably with chain lengths of up to 18 carbon atoms or even up to 42 carbon atoms and/or triglycerides such as the esters of C6 to C12 fatty acids and glycerol. Exemplary carriers and solvents include, but are not limited to: ethyldiphenylmethane; isopropyl diphenylethane; butyl biphenyl ethane; benzylxylene; alkyl biphenyls such as propylbiphenyl and butylbiphenyl; dialkyl phthalates e.g. dibutyl phthalate, dioctylphthalate, dinonyl phthalate and ditridecylphthalate; 2,2,4-trimethyl-1,3-pentanediol diisobutyrate; alkyl benzenes such as dodecyl benzene; alkyl or aralkyl benzoates such as benzyl benzoate; diaryl ethers; di(aralkyl)ethers and aryl aralkyl ethers; ethers such as diphenyl ether, dibenzyl ether and phenyl benzyl ether; liquid higher alkyl ketones (having at least 9 carbon atoms); alkyl or aralkyl benzoates, e.g., benzyl benzoate; alkylated naphthalenes such as dipropylnaphthalene; partially hydrogenated terphenyls; high-boiling straight or branched chain hydrocarbons; alkaryl hydrocarbons such as toluene; vegetable and other crop oils such as canola oil, soybean oil, corn oil, sunflower oil, cottonseed oil, lemon oil, olive oil and pine oil; methyl esters of fatty acids derived from transesterification of vegetable and other crop oils, methyl ester of oleic acid, esters of vegetable oil, e.g. soybean methyl ester, straight chain paraffinic aliphatic hydrocarbons, and mixtures of the foregoing.

Useful benefit agents include perfume raw materials, such as alcohols, ketones, aldehydes, esters, ethers, nitriles, alkenes, fragrances, fragrance solubilizers, essential oils, phase change materials, lubricants, colorants, cooling agents, preservatives, antimicrobial or antifungal actives, herbicides, antiviral actives, antiseptic actives, antioxidants, biological actives, deodorants, emollients, humectants, exfoliants, ultraviolet absorbing agents, self-healing compositions, corrosion inhibitors, sunscreens, silicone oils, waxes, hydrocarbons, higher fatty acids, essential oils, lipids, skin coolants, vitamins, sunscreens, antioxidants, glycerine, catalysts, bleach particles, silicon dioxide particles, malodor reducing agents, dyes, brighteners, antibacterial actives, antiperspirant actives, cationic polymers and mixtures thereof. Phase change materials useful as benefit agents can include, by way of illustration and not limitation, paraffinic hydrocarbons having 13 to 28 carbon atoms, various hydrocarbons such n-octacosane, n-heptacosane, n-hexacosane, n-pentacosane, n-tetracosane, n-tricosane, n-docosane, n-heneicosane, n-eicosane, n-nonadecane, octadecane, n-heptadecane, n-hexadecane, n-pentadecane, n-tetradecane, n-tridecane. Phase change materials can alternatively, optionally in addition include crystalline materials such as 2,2-dimethyl-1,3-propanediol, 2-hydroxymethyl-2-methyl-1, 3-propanediol, acids of straight or branched chain hydrocarbons such as eicosanoic acid and esters such as methyl palmitate, fatty alcohols and mixtures thereof.

Preferably, in the case of fragrances, a perfume oil acts as benefit agent and solvent for the wall forming material, as illustrated in the examples herein.

The invention makes possible tailored surface charge of chitosan urea-based microcapsules by chemical attachment on the surface, especially the external surface of the microcapsule, through the charged domains or charged pendant groups of the resulting polymer.

Optionally the water phase may include an emulsifier. Non-limiting examples of emulsifiers include water-soluble salts of alkyl sulfates, alkyl ether sulfates, alkyl isothionates, alkyl carboxylates, alkyl sulfosuccinates, alkyl succinamates, alkyl sulfate salts such as sodium dodecyl sulfate, alkyl sarcosinates, alkyl derivatives of protein hydrolyzates, acyl aspartates, alkyl or alkyl ether or alkylaryl ether phosphate esters, sodium dodecyl sulphate, phospholipids or lecithin, or soaps, sodium, potassium or ammonium stearate, oleate or palmitate, alkylarylsulfonic acid salts such as sodium dodecylbenzenesulfonate, sodium dialkylsulfosuccinates, dioctyl sulfosuccinate, sodium dilaurylsulfosuccinate, poly(styrene sulfonate) sodium salt, isobutylene-maleic anhydride copolymer, gum arabic, sodium alginate, carboxymethylcellulose, cellulose sulfate and pectin, poly(styrene sulfonate), isobutylene-maleic anhydride copolymer, carrageenan, sodium alginate, pectic acid, tragacanth gum, almond gum and agar; semi-synthetic polymers such as carboxymethyl cellulose, sulfated cellulose, sulfated methylcellulose, carboxymethyl starch, phosphated starch, lignin sulfonic acid; and synthetic polymers such as maleic anhydride copolymers (including hydrolyzates thereof), polyacrylic acid, polymethacrylic acid, acrylic acid butyl acrylate copolymer or crotonic acid homopolymers and copolymers, vinyl benzenesulfonic acid or 2-acrylamido-2-methylpropanesulfonic acid homopolymers and copolymers, and partial amide or partial ester of such polymers and copolymers, carboxy modified polyvinyl alcohol, sulfonic acid-modified polyvinyl alcohol and phosphoric acid-modified polyvinyl alcohol, phosphated or sulfated tristyrylphenol ethoxylates, palmitamidopropyltrimonium chloride (Varisoft PATC™, available from Degussa Evonik, Essen, Germany), distearyl dimonium chloride, cetyltrimethylammonium chloride, quaternary ammonium compounds, fatty amines, aliphatic ammonium halides, alkyldimethylbenzylammonium halides, alkyldimethylethylammonium halides, polyethyleneimine, poly(2-dimethylamino)ethyl methacrylate) methyl chloride quaternary salt, poly(l-vinylpyrrolidone-co-2-dimethylaminoethyl methacrylate), poly(acrylamide-co-diallyldimethylammonium chloride), poly(allylamine), poly[bis(2-chloroethyl) ether-alt-1,3-bis[3-(dimethylamino)propyl]urea]quaternized, and poly(dimethylamine-co-epichlorohydrin-co-ethylenediamine), condensation products of aliphatic amines with alkylene oxide, quaternary ammonium compounds with a long-chain aliphatic radical, e.g. distearyldiammonium chloride, and fatty amines, alkyldimethylbenzylammonium halides, alkyldimethylethylammonium halides, polyalkylene glycol ether, condensation products of alkyl phenols, aliphatic alcohols, or fatty acids with alkylene oxide, ethoxylated alkyl phenols, ethoxylated aryl phenols, ethoxylated polyaryl phenols, carboxylic esters solubilized with a polyol, polyvinyl alcohol, polyvinyl acetate, or copolymers of polyvinyl alcohol polyvinyl acetate, polyacrylamide, poly(N-isopropylacrylamide), poly(2-hydroxypropyl methacrylate), poly(-ethyl-2-oxazoline), poly(2-isopropenyl-2-oxazoline-co-methyl methacrylate), poly(methyl vinyl ether), and polyvinyl alcohol-co-ethylene), and cocoamidopropyl betaine. Emulsifier, if employed, is typically from about 0.1 to 40% by weight, preferably 0.2 to about 15% by weight, more typically 0.5 to 10% be weight, based on total weight of the formulation The microcapsules may encapsulate a partitioning modifier in addition to the benefit agent. Non-limiting examples of partitioning modifiers include isopropyl myristate, mono-, di-, and tri-esters of $C_4$-$C_{24}$ fatty acids, castor oil, mineral oil, soybean oil, hexadecanoic acid, methyl ester isododecane, isoparaffin oil, polydimethylsiloxane, brominated vegetable oil, and combinations thereof. Microcapsules may also have varying ratios of the partitioning modifier to the benefit agent so as to make different populations of microcapsules that may have different bloom patterns. Such populations may also incorporate different perfume oils so as to make populations of microcapsules that display different bloom patterns and different scent experiences. US 2011-0268802 discloses other non-limiting examples of microcapsules and partitioning modifiers and is hereby incorporated by reference.

in the formation of the chitosan microcapsules, the aqueous solution contains a residual quantity of the hydrolyzed chitosan. This provides the option of dewatering the microcapsules such as through decanting, filtration, centrifuging or other separation technique. Alternatively, the aqueous slurry of chitosan polyurea microcapsules can be spray dried forming chitosan polyurea microcapsules further coated with a layer of the residual hydrolyzed chitosan from the water phase.

In one embodiment, the formed slurry of microcapsules can be further dispersed in additional water or with low concentration of residual overcoating hydrolyzed chitosan yielding chitosan polyurea microcapsules that can fracture upon drying, providing an additional release mechanism useful in some applications such as fragrance delivery or with agricultural actives for targeted delivery.

In some examples of the process and compositions, the microcapsules may consist of one or more distinct populations. The composition may have at least two different populations of microcapsules that vary in the exact make-up of the perfume oil and in the median particle size and/or partitioning modifier to perfume oil (PM:PO) weight ratio. In some examples, the composition includes more than two distinct populations that vary in the exact make up the perfume oil and in their fracture strengths. In some further examples, the populations of microcapsules can vary with respect to the weight ratio of the partitioning modifier to the perfume oil(s). In some examples, the composition can include a first population of microcapsules having a first ratio that is a weight ratio of from 2:3 to 3:2 of the partitioning modifier to a first perfume oil and a second population of microcapsules having a second ratio that is a weight ratio of less than 2:3 but greater than 0 of the partitioning modifier to a second perfume oil.

In some embodiments, each distinct population of microcapsules is preparable in a distinct slurry. For example, the first population of microcapsules can be contained in a first slurry and the second population of microcapsules contained in a second slurry. It is to be appreciated that the number of distinct slurries for combination is without limit and a choice of the formulator such that 3, 10, or 15 distinct slurries may be combined. The first and second populations of microcapsules may vary in the exact make up the perfume oil and in the median particle size and/or PM:PO weight ratio.

In some embodiments, the composition, can be prepared by combining the first and second slurries with at least one adjunct ingredient and optionally packaged in a container. In some examples, the first and second populations of microcapsules can be prepared in distinct slurries and then spray dried to form a particulate. The distinct slurries may be combined before spray drying, or spray dried individually and then combined together when in particulate powder form. Once in powder form, the first and second populations of microcapsules may be combined with an adjunct ingredient to form the composition useful as a feedstock for manufacture of consumer, industrial, medical or other goods. In some examples, at least one population of microcapsules is spray dried and combined with a slurry of a second population of microcapsules. In some examples, at least one population of microcapsules is dried, prepared by spray drying, fluid bed drying, tray drying, or other such drying processes that are available.

In some examples, the slurry or dry particulates can include one or more adjunct materials such as processing aids selected from the group consisting of a carrier, an aggregate inhibiting material, a deposition aid, a particle suspending polymer, and mixtures thereof. Non-limiting examples of aggregate inhibiting materials include salts that can have a charge-shielding effect around the particle, such as magnesium chloride, calcium chloride, magnesium bromide, magnesium sulfate, and mixtures thereof. Non-limiting examples of particle suspending polymers include polymers such as xanthan gum, carrageenan gum, guar gum, shellac, alginates, chitosan; cellulosic materials such as carboxymethyl cellulose, hydroxypropyl methyl cellulose, cationically charged cellulosic materials; polyacrylic acid; polyvinyl alcohol; hydrogenated castor oil; ethylene glycol distearate; and mixtures thereof.

In some embodiments, the slurry can include one or more processing aids, selected from the group consisting of water, aggregate inhibiting materials such as divalent salts; particle suspending polymers such as xanthan gum, guar gum, carboxy methyl cellulose.

In other examples of the invention, the slurry can include one or more carriers selected from the group consisting of polar solvents, including but not limited to, water, ethylene glycol, propylene glycol, polyethylene glycol, glycerol; non-polar solvents, including but not limited to, mineral oil, perfume raw materials, silicone oils, hydrocarbon paraffin oils, and mixtures thereof.

In some examples, said slurry may include a deposition aid that may comprise a polymer selected from the group comprising: polysaccharides, in one aspect, cationically modified starch and/or cationically modified guar; polysiloxanes; poly diallyl dimethyl ammonium halides; copolymers of poly diallyl dimethyl ammonium chloride and polyvinyl pyrrolidone; a composition comprising polyethylene glycol and polyvinyl pyrrolidone; acrylamides; imidazoles; imidazolinium halides; polyvinyl amine; copolymers of poly vinyl amine and N-vinyl formamide; polyvinyl formamide, polyvinyl alcohol; polyvinyl alcohol cross-linked with boric acid; polyacrylic acid; polyglycerol ether silicone cross-polymers; polyacrylic acids, polyacrylates, copolymers of polyvinylamine and polvyinylalcohol oligomers of amines, in one aspect a diethylenetriamine, ethylene diamine, bis(3-aminopropyl)piperazine, N,N-Bis-(3-aminopropyl)methylamine, tris(2-aminoethyl)amine and mixtures thereof; polyethyleneimine, a derivatized polyethyleneimine, in one aspect an ethoxylated polyethyleneimine; a polymeric compound comprising, at least two moieties selected from the moieties consisting of a carboxylic acid moiety, an amine moiety, a hydroxyl moiety, and a nitrile moiety on a backbone of polybutadiene, polyisoprene, polybutadiene/styrene, polybutadiene/acrylonitrile, carboxyl-terminated polybutadiene/acrylonitrile or combinations thereof; pre-formed coacervates of anionic surfactants combined with cationic polymers; polyamines and mixtures thereof.

In some additional examples to illustrate the invention, at least one population of microcapsules can be contained in an agglomerate and then combined with a distinct population of microcapsules and at least one adjunct material. Said agglomerate may comprise materials selected from the group consisting of silicas, citric acid, sodium carbonate, sodium sulfate, sodium chloride, and binders such as sodium silicates, modified celluloses, polyethylene glycols, polyacrylates, polyacrylic acids, zeolites and mixtures thereof.

Suitable equipment for use in the processes disclosed herein may include continuous stirred tank reactors, homogenizers, turbine agitators, recirculating pumps, paddle mixers, plough shear mixers, ribbon blenders, vertical axis granulators and drum mixers, both in batch and, where available, in continuous process configurations, spray dryers, and extruders. Such equipment can be obtained from Lodige GmbH (Paderborn, Germany), Littleford Day, Inc. (Florence, Ky., U.S.A.), Forberg AS (Larvik, Norway), Glatt Ingenieurtechnik GmbH (Weimar, Germany), Niro (Soeborg, Denmark), Hosokawa Bepex Corp. (Minneapolis, Minn., U.S.A.), Arde Barinco (New Jersey, U.S.A.).

Procedure for Determination of % Degradation

% degradation is determined by the "OECD Guideline for Testing of Chemicals" 301B $CO_2$ Evolution (Modified Sturm Test), adopted 17 Jul. 1992. For ease of reference, this test method is referred to herein as test method OECD 301B Procedure for Determination of Free Oil This method measures the amount of oil in the water phase and uses as an internal standard solution 1 mg/ml dibutyl phthalate (DBP)/hexane.

Weigh a little more than 250 mgs of DBP into a small beaker and transfer to a 250 ml volumetric rinsing the beaker thoroughly. Fill with hexane to 250 ml.

Sample Prep: Weigh approximately 1.5-2 grams (40 drops) of the capsule slurry into a 20 ml scintillation vial and add 10 ml's of the ISTD solution, cap tightly. Shaking vigorously several times over 30 minutes, pipette solution into an autosampler vial and analyze by GC.

Additional details. Instrumentation: HP5890 GC connected to HP Chem Station Software; Column: 5 m×0.32 mm id with 1 μm DB-1 liquid phase; Temperature 50 deg for 1 minute then heat to 320 deg @ 15 deg/min; Injector: 275° C.; Detector: 325° C.; 2 ul injection.

Calculation: Add total peak area minus the area for the DBP for both the sample and calibration. Calculate mg of free core oil:

$$\frac{\text{Total area from sample}}{\text{Total area from calibration}} \times \text{mg of oil in calibration solution} = \text{mg of free oil}$$

Calculate % Free Core Oil $$\frac{\text{mg of free core oil}}{\text{Sample wt. (mg)}} \times 100 = \% \text{ free core oil in wet slurry}$$

Procedure for Determination of Benefit Agent Leakage

Obtain 2, one gram samples of benefit agent particle composition. Add 1 gram (Sample 1) of particle composition to 99 grams of product matrix in which the particle will be employed. Age the particle containing product matrix (Sample 1) for 2 weeks at 35° C. in a sealed glass jar. The other 1 gram sample (Sample 2) is similarly aged.

After 2 weeks, use filtration to recover the particle composition's particles from the product matrix (Sample 1) and from the particle composition (Sample 2). Treat each particle sample with a solvent that will extract all the benefit agent from each samples' particles. Inject the benefit agent containing solvent from each sample into a Gas Chromatograph and integrate the peak areas to determine the total quantity of benefit agent extracted from each sample.

Determine the percentage of benefit agent leakage by calculating the difference in the values obtained for the total quantity of benefit agent extracted from Sample 2 minus Sample 1, expressed as a percentage of the total quantity of benefit agent extracted from Sample 2, as represented in the equation below:

$$\text{Percentage of Benefit Agent Leakage} = \left(\frac{\text{Sample 2} - \text{Sample 1}}{\text{Sample 2}}\right) \times 100$$

Figure 1:
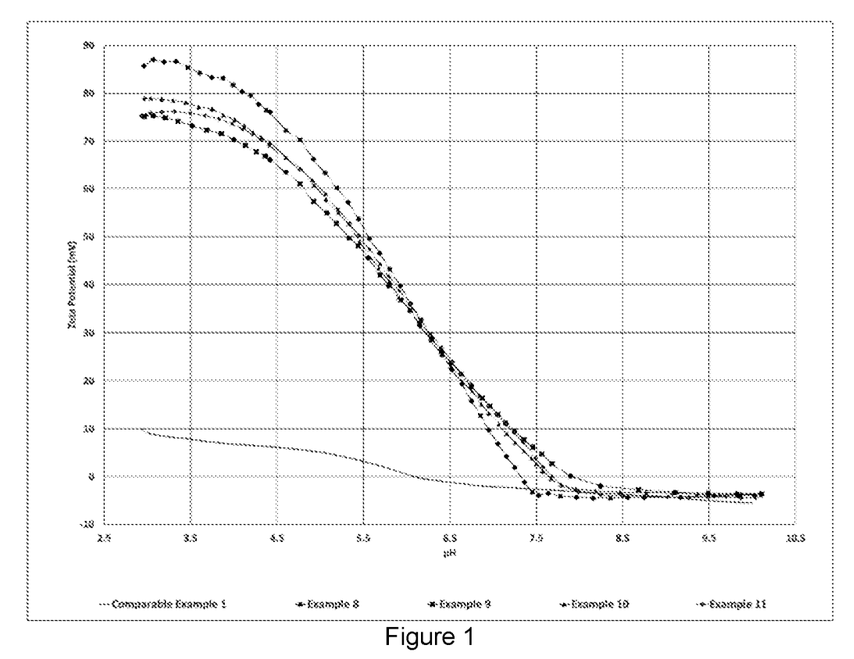
FIGS. 1 and 2 are graphs of zeta potential for microcapsules prepared according to the invention.
Figure 2:
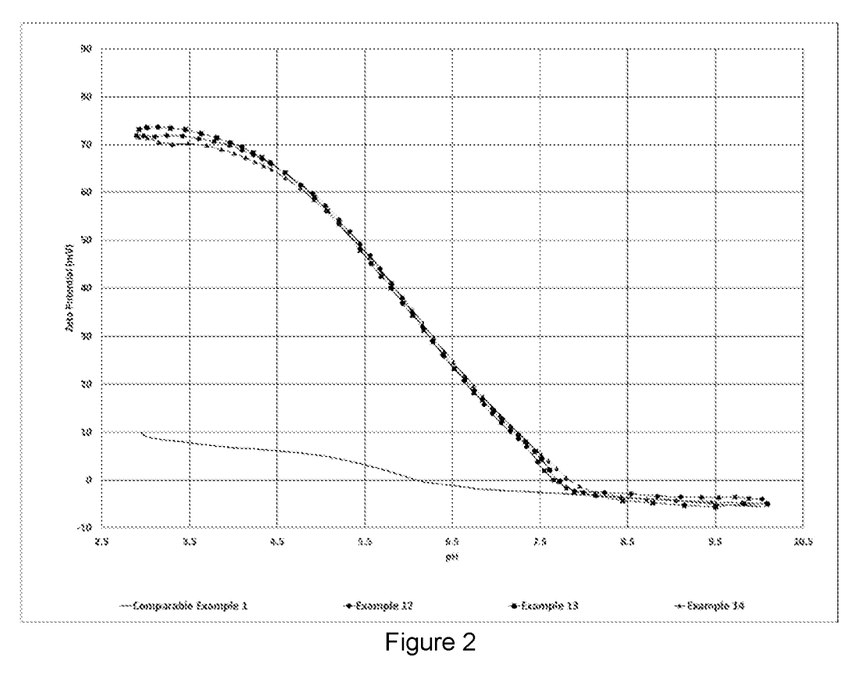

Polyurea capsules prepared with chitosan exhibit positive zeta potentials as shown in FIG. 1. Such capsules have improved deposition efficiency on fabrics.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

In the following examples, the abbreviations correspond to the materials listed in Table 1.

TABLE 1

| Trade Name | Company/City | Material |
| --- | --- | --- |
| Selvol 540 | Sekisui Specialty Chemicals, Dallas, TX | Polyvinyl alcohol |
| ChitoClear | Primex EHF, Siglufjordur, Iceland | chitosan |
| Takenate D-110N | Mitsui Chemicals America, Inc., Rye Brook, NY | aliphatic polyisocyanate prepolymer |
| Mondur MR | Covestro LLC, Pittsburgh, PA | Polymeric diphenyl methane diisocyanate |
| SAS-305 | JX Nippon Chemical Texas Inc., Pasadena, TX | isopropyl diphenylethane |

Comparative Example 1

An aqueous phase one is prepared by mixing 86.40 g 5% Selvol 540 in 273.60 g deionized water. The oil phase is prepared by mixing 159.38 g perfume oil and 23.91 g isopropyl myristate together and then dissolving 4.0 g Takenate D-110N into it with mixing. A water phase two is prepared by mixing 0.38 g diethylenetriamine in 25.00 g water. An emulsion is formed by mixing the oil phase into water phase one and milling to obtain a target particle size. Water phase two is then added to the emulsion which is then heated to 40° C. in 30 m ins and held for 60 m ins. The emulsion is then heated to 85° C. and maintained at this temperature for 6 hours with mixing. The free oil of the final slurry is 4.068%.

Comparative Example 2

A water phase is prepared by dispersing 20.66 g Chito-Clear into 439.00 g water while mixing in a jacketed reactor. The pH of the water phase is then adjusted to 2.61 using concentrated HCl under agitation. The water phase temperature is then increased to 85° C. over 60 minutes and then held at 85° C. fora period of time to hydrolyze the Chito-Clear. The water phase temperature is then reduced to 25° C. after the hydrolyzing step over a period of 90 minutes. An oil phase is prepared by mixing 139.58 g perfume oil and 23.91 g isopropyl myristate together along with 4.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. No capsules are formed at this pH condition.

Example 3

A water phase is prepared by dispersing 12.40 g Chito-Clear into 350.00 g water while mixing in a jacketed reactor. The pH of the water phase is then adjusted to 4.7 using concentrated HCl under agitation. The water phase temperature is then increased to 85° C. over 60 minutes and then held at 85° C. fora period of time to hydrolyze the Chito-Clear. The water phase temperature is then reduced to 25° C. after the hydrolyzing step over a period of 90 minutes. An oil phase is prepared by mixing 87.50 g perfume oil and 22.50 g isopropyl myristate together along with 15.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a free oil of 0.090% and a one week leakage of 3.604%.

Example 4

A water phase is prepared by dispersing 12.40 g Chito-Clear into 350.00 g water while mixing in a jacketed reactor. The pH of the water phase is then adjusted to 5.0 using concentrated HCl under agitation. The water phase temperature is then increased to 85° C. over 60 minutes and then held at 85° C. fora period of time to hydrolyze the Chito-Clear. The water phase temperature is then reduced to 25° C. after the hydrolyzing step over a period of 90 minutes. An oil phase is prepared by mixing 159.38 g perfume oil and 23.91 g isopropyl myristate together along with 15.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a free oil of 0.088% and a one week leakage of 2.918%.

Example 5

A water phase is prepared by dispersing 12.40 g Chito-Clear into 350.00 g water while mixing in a jacketed reactor. The pH of the water phase is then adjusted to 5.5 using concentrated HCl under agitation. The water phase temperature is then increased to 85° C. over 60 minutes and then held at 85° C. fora period of time to hydrolyze the Chito-Clear. The water phase temperature is then reduced to 25° C. after the hydrolyzing step over a period of 90 minutes. An oil phase is prepared by mixing 159.38 g perfume oil and 23.91 g isopropyl myristate together along with 15.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a free oil of 0.043% and a one week leakage of 2.009%.

Example 6

A water phase is prepared by dispersing 12.40 g Chito-Clear into 350.00 g water while mixing in a jacketed reactor. The pH of the water phase is then adjusted to 6.1 using concentrated HCl under agitation. The water phase temperature is then increased to 85° C. over 60 minutes and then held at 85° C. fora period of time to hydrolyze the Chito-Clear. The water phase temperature is then reduced to 25° C. after the hydrolyzing step over a period of 90 minutes. An oil phase is prepared by mixing 159.38 g perfume oil and 23.91 g isopropyl myristate together along with 15.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a free oil of 0.111% and a one week leakage of 1.909%.

Example 7

A water phase is prepared by dispersing 12.40 g Chito-Clear into 350.00 g water while mixing in a jacketed reactor. The pH of the water phase is then adjusted to 6.0 using concentrated HCl under agitation. The water phase temperature is then increased to 85° C. over 60 minutes and then held at 85° C. fora period of time to hydrolyze the Chito-Clear. The water phase temperature is then reduced to 25° C. after the hydrolyzing step over a period of 90 minutes. An oil phase is prepared by mixing 159.38 g perfume oil and 23.91 g isopropyl myristate together along with 15.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a free oil of 0.076% and a one week leakage of 1.112%.

Example 8

A water phase is prepared by dispersing 26.45 g Chito-Clear into 450.00 g water while mixing in a jacketed reactor. The pH of the water phase is then adjusted to 6.0 using concentrated HCl under agitation. The water phase temperature is then increased to 85° C. over 60 minutes and then held at 85° C. fora period of time to hydrolyze the Chito-Clear. The water phase temperature is then reduced to 25° C. after the hydrolyzing step over a period of 90 minutes. An oil phase is prepared by mixing 159.38 g perfume oil and 23.91 g isopropyl myristate together along with 4.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a free oil of 0.674% and a one week leakage of 41.930%.

Example 9

A water phase is prepared by dispersing 12.40 g Chito-Clear into 350.00 g water while mixing in a jacketed reactor. The pH of the water phase is then adjusted to 6.0 using concentrated HCl under agitation. The water phase temperature is then increased to 85° C. over 60 minutes and then held at 85° C. fora period of time to hydrolyze the Chito-Clear. The water phase temperature is then reduced to 25° C. after the hydrolyzing step over a period of 90 minutes. An oil phase is prepared by mixing 159.38 g perfume oil and 23.91 g isopropyl myristate together along with 4.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a free oil of 0.272% and a one week leakage of 13.222%.

Example 10

A water phase is prepared by dispersing 20.66 g Chito-Clear into 439.00 g water while mixing in a jacketed reactor. The pH of the water phase is then adjusted to 6.0 using concentrated HCl under agitation. The water phase temperature is then increased to 85° C. over 60 minutes and then held at 85° C. fora period of time to hydrolyze the Chito-Clear. The water phase temperature is then reduced to 25° C. after the hydrolyzing step over a period of 90 minutes. An oil phase is prepared by mixing 159.38 g perfume oil and 23.91 g isopropyl myristate together along with 4.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a free oil of 0.304% and a one week leakage of 17.454%.

Example 11

A water phase is prepared by dispersing 20.66 g Chito-Clear into 439.00 g water while mixing in a jacketed reactor. The pH of the water phase is then adjusted to 3.8 using concentrated HCl under agitation. The water phase temperature is then increased to 85° C. over 60 minutes and then held at 85° C. fora period of time to hydrolyze the Chito-Clear. The water phase temperature is then reduced to 25° C. after the hydrolyzing step over a period of 90 minutes. An oil phase is prepared by mixing 159.38 g perfume oil and 23.91 g isopropyl myristate together along with 4.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a one week leakage of 28.204%.

Example 12

A water phase is prepared by dispersing 20.66 g Chito-Clear into 439.00 g water while mixing in a jacketed reactor. The pH of the water phase is then adjusted to 4.2 using concentrated HCl under agitation. The water phase temperature is then increased to 85° C. over 60 minutes and then held at 85° C. fora period of time to hydrolyze the Chito-Clear. The water phase temperature is then reduced to 25° C. after the hydrolyzing step over a period of 90 minutes. An oil phase is prepared by mixing 159.38 g perfume oil and 23.91 g isopropyl myristate together along with 4.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a one week leakage of 24.174%.

Example 13

A water phase is prepared by dispersing 20.66 g Chito-Clear into 439.00 g water while mixing in a jacketed reactor. The pH of the water phase is then adjusted to 4.9 using concentrated HCl under agitation. The water phase temperature is then increased to 85° C. over 60 minutes and held at 85° C. fora period of time to hydrolyze the Chito-Clear. The water phase temperature is then reduced to 25° C. after the hydrolyzing step over a period of 90 minutes. An oil phase is prepared by mixing 159.38 g perfume oil and 23.91 g isopropyl myristate together along with 4.00 g Takenate D-110N at room temperature. The oil phase is added to the water phase under high shear milling to obtain an emulsion. The emulsion is heated to 40° C. over 30 minutes and held for 60 minutes. pH of the emulsion was then adjusted to 2.97 using hydrochloric acid. The emulsion is then heated to 85° C. and maintained at this temperature for 6 hours while mixing. The capsules formed at this pH condition had a one week leakage of 76.182%.

Example 14

A water phase is prepared by dispersing 20.66 g Chito-Clear into 439.00 g water while mixing in a jacketed reactor. The pH of the water phase is then adjusted to 4.7 using concentrated HCl under agitation. The water phase temperature is then increased to 85° C. over 60 minutes and then held at 85° C. fora period of time to hydrolyze the Chito-Clear. The water phase temperature is then reduced to 25° C. after the hydrolyzing step over a period of 90 minutes. An oil phase is prepared by mixing 159.38 g perfume oil and 23.91 g isopropyl myristate together along with 4.00 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a free oil of 0.225% and a one week leakage of 52.824%.

Example 15

A water phase is prepared by dispersing 5.70 g ChitoClear into 350.00 g water while mixing in a jacketed reactor. The pH of the water phase is then adjusted to 4.7 using concentrated HCl under agitation. The water phase temperature is then increased to 85° C. over 60 minutes and then held at 85° C. fora period of time to hydrolyze the ChitoClear. The water phase temperature is then reduced to 25° C. after the hydrolyzing step over a period of 90 minutes. An oil phase is prepared by mixing 120.00 g perfume oil and 30.00 g isopropyl myristate together along with 3.78 g Mondur MR at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a free oil of 7.358%.

Example 16

A water phase is prepared by dispersing 5.70 g ChitoClear into 350.00 g water while mixing in a jacketed reactor. The pH of the water phase is then adjusted to 4.0 using concentrated HCl under agitation. The water phase temperature is then increased to 85° C. over 60 minutes and then held at 85° C. fora period of time to hydrolyze the ChitoClear. The water phase temperature is then reduced to 25° C. after the hydrolyzing step over a period of 90 minutes. An oil phase is prepared by mixing 150.00 g SAS-305 with 3.78 g Mondur MR at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a free oil of 0.006%.

Example 17

A water phase is prepared by dispersing 5.70 g ChitoClear into 350.00 g water while mixing in a jacketed reactor. The pH of the water phase is then adjusted to 4.3 using concentrated HCl under agitation. The water phase temperature is then increased to 85° C. over 60 minutes and then held at 85° C. fora period of time to hydrolyze the ChitoClear. The water phase temperature is then reduced to 25° C. after the hydrolyzing step over a period of 90 minutes. An oil phase is prepared by mixing 150.00 g SAS-150 with 3.78 g Mondur MR at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed at this pH condition had a free oil of 0.005%.

TABLE 2

| Example | Hydrolysis PH | Percent degradation 7 days | Percent degradation 14 days | Percent degradation 21 days | Percent degradation 28 days |
|---|---|---|---|---|---|
| 10 | 6.0 | 2.22 | 5.75 | 8.88 | 11.07 |
| 11 | 3.8 | 29.3 | 57.54 | 68.48 | 73.28 |
| 12 | 4.2 | 24.64 | 52.58 | 62.38 | 67.65 |
| 13 | 4.9 | 28.54 | 52.95 | 61.43 | 64.26 |
| 14 | 4.7 | 21.51 | 44.54 | 54.95 | 60.04 |

Example 18—Comparative Example

An aqueous phase one is prepared by mixing 69.12 g 5% Selvol 540 in 218.88 g deionized water. The oil phase is prepared by mixing 124.64 g perfume oil and 31.16 g isopropyl myristate together and then dissolving 3.40 g Takenate D-110N into it with mixing. A water phase two is prepared by mixing 0.32 g diethylenetriamine in 25.00 g water. An emulsion is formed by mixing the oil phase into water phase one and milling to obtain a target volume weighted median particle size of 29.52 um. Water phase two is then added to the emulsion which is then heated to 40° C. in 30 minutes and held for 60 minutes. The emulsion is then heated to 85° C. and maintained at this temperature for 6 hours with mixing. The emulsion is then cooled down to 25° C. in 90 minutes. The capsules formed had a free oil of 0.366% and a one week leakage of 20.77.

Example 19

A chitosan stock solution is prepared by dispersing 121.50 g chitosan Chitoclear into 2578.5 g deionized water while mixing in a jacketed reactor. The pH of the chitosan dispersion is then adjusted to 5.28 using concentrated HCl under agitation. The temperature of the chitosan solution is then increased to 85° C. over 60 minutes and then held at 85° C. for a period of time to hydrolyze the ChitoClear. The temperature is then reduced to 25° C. after the hydrolyzing step over a period of 90 minutes. The pH of the hydrolyzed chitosan solution is 5.36. A water phase is prepared by mixing 362.36 g of the above chitosan stock solution in a jacketed reactor. An oil phase is prepared by mixing 124.64 g perfume and 31.16 g isopropyl myristate together along with 3.40 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed had a free oil of 0.057% and a one week leakage of 9.19%.

Example 20

A water phase is prepared by mixing 362.36 g of the above chitosan stock solution with 3.66 g Selvol 540 solution in a jacketed reactor. An oil phase is prepared by mixing 124.64 g perfume and 31.16 g isopropyl myristate together along with 3.40 g Takenate D-110N at room temperature. The oil phase is added to the water phase under high shear milling to obtain an emulsion. The emulsion is heated to 40° C. over 30 minutes and held for 60 minutes. The emulsion is then heated to 85° C. and maintained at this temperature for 6 hours while mixing. The capsules formed had a free oil of 0.065% and a one week leakage of 11.38%.

Evaluating Performance of Liquid Fabric Softener Comprising Delivery Particles Liquid fabric softener comprising delivery particles were prepared as described in Table 4 to obtain 0.5% fragrance equivalent. Formulations equilibrated overnight (~12 hours). A 9 lb. wash load contained a mix of cotton and polyester/cotton blend articles (terry washcloths, T-shirts, pillowcases, and hand towels) as listed in Table 3. The wash cycle was performed using a scent free laundry detergent and the formulated products were dosed in the rinse cycle at 90 grams.

TABLE 3

| Wash Load: 9 lbs | # Items | Fabric |
|---|---|---|
| terry washcloths | 10 | 100% cotton |
| t-shirts (V-necks), L | 12 | 100% cotton |
| t-shirts (crew neck), L | 2 | 100% cotton |
| pillowcases | 10 | 60/40 cotton/polyester blend |
| terry hand towel | 10 | 86/14 cotton/polyester blend |

A panel of 10 individuals evaluated the items before and after washing, rating the sensory intensity on the following scale: 0=No Odor, 1=Faint Odor, 2=Distinct Odor, 3=Very Strong Odor. The pre- and post-rub sensory intensities are listed in Table 4.

TABLE 4

|  | A | B | C | D |
|---|---|---|---|---|
| Liquid Fabric Softener Preparation |  |  |  |  |
| Fragrance Free Downy ™ Liquid Fabric Softener | 88.163 g | 88.140 g | 88.282 g | 89.550 g |
| perfume |  |  |  | 0.450 g |
| perfume via delivery particles from Comparative Example 18 |  |  | 1.718 g |  |
| perfume via delivery particles from Example 19 |  | 1.860 g |  |  |
| perfume via delivery particles from Example 20 | 1.837 g |  |  |  |
| Sensory Evaluation |  |  |  |  |
| pre-rub sensory intensity | 1.30 | 0.60 | 0.50 | 0.50 |
| post-rub sensory intensity | 1.35 | 1.30 | 0.70 | 0.70 |

Evaluating Performance of Liquid Laundry Detergent Comprising Delivery Particles Liquid laundry detergent comprising delivery particles were prepared as described below in Table 5 to obtain 0.5% fragrance equivalent. Formulations equilibrated overnight (~12 hours). A 9 lb. wash load contained a mix of cotton and polyester/cotton blend articles (terry washcloths, T-shirts, pillowcases, and hand towels) as listed in Table 3. The formulated products were dosed in the rinse cycle at 40 grams.

A panel of 10 individuals evaluated the items before and after washing, rating the sensory intensity on the following scale: 0=No Odor, 1=Faint Odor, 2=Distinct Odor, 3=Very Strong Odor. The pre- and post-rub sensory intensities are listed in Table 5.

TABLE 5

|  | E | F | G | H |
|---|---|---|---|---|
| Liquid Laundry Detergent Preparation |  |  |  |  |
| Fragrance Free Seventh Generation ™ heavy duty laundry detergent (HDL) | 39.119 g | 39.183 g | 39.176 g | 39.800 g |
| perfume |  |  |  | 0.200 g |
| perfume via delivery particles from Comparative Example 18 |  |  | 0.764 g |  |

TABLE 5-continued

|  | E | F | G | H |
|---|---|---|---|---|
| perfume via delivery particles from Example 19 |  | 0.817 g |  |  |
| perfume via delivery particles from Example 20 | 0.817 g |  |  |  |
| deposition aid Noverite 301 polymer (Lubrizol Corporation) | 0.064 g |  | 0.060g |  |
| Sensory Evaluation |  |  |  |  |
| pre-rub sensory intensity | 1.00 | 0.50 | 0.10 | 0.30 |
| post-rub sensory intensity | 1.40 | 0.90 | 0.35 | 0.40 |

Percent degradation is measured according to the OECD Guidelines for the Testing of Chemicals, test method OECD 301B. A copy is available in www.oecdilibrary.org.

The shell of the composition according to the invention has a % degradation of at least 40% degradation after 14 days, of at least 50 degradation after at least 20 days, and of at least 60% degradation after at least 28 days when tested according to test method OECD TG 301B.

Uses of singular "a," "an," are intended to cover both the singular and the plural, unless otherwise indicated herein or clearly contradicted by context. The terms "comprising," "having," "including," and "containing" are to be construed as open-ended terms. All references, including publications, patent applications, and patents, cited herein are hereby incorporated by reference. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims.

What is claimed is:

1. A process of forming a population of microcapsules comprising a core and a shell surrounding the core, the process comprising:
   forming a water phase by hydrolyzing chitosan in an aqueous acidic medium at a pH of from 3 to pH 6.5 and a temperature of at least 60° C. for at least one hour;
   forming an oil phase comprising dissolving together at least one benefit agent and at least one polyisocyanate, optionally with an added oil;
   forming an emulsion by mixing under high shear agitation the water phase and the oil phase into an excess of the water phase, thereby forming droplets of the oil phase and benefit agent dispersed in the water phase,
   curing the emulsion by heating to at least 40° C., for a time sufficient to form a shell at an interface of the droplets with the water phase, the shell comprising the reaction product of the polyisocyanate and hydrolyzed chitosan, and the shell surrounding the core comprising the droplets of the oil phase and benefit agent.

2. A process of forming a population of microcapsules comprising a core and a shell surrounding the core, the process comprising:
   forming a water phase by hydrolyzing chitosan in an aqueous acidic medium at a pH of 3 to pH 6.5 and a temperature of at least 45° C. for at least one hour;
   forming an oil phase comprising dissolving together at least one benefit agent and at least one polyisocyanate, optionally with an added oil;
   forming an emulsion by mixing under high shear agitation the water phase and the oil phase into an excess of the water phase, thereby forming droplets of the oil phase and benefit agent dispersed in the water phase,
   curing the emulsion by heating to at least 40° C., for a time sufficient to form a shell at an interface of the droplets with the water phase, the shell comprising the reaction product of the polyisocyanate and hydrolyzed chitosan, and the shell surrounding the core comprising the droplets of the oil phase and benefit agent.

3. The process according to claim 1 wherein the chitosan in the hydrolyzing step is deacetylated to at least 75%, or even at least 80%, or at least 85%, or even at least 92%.

4. The process according to claim 1 wherein the chitosan in the hydrolyzing step is depolymerized to an average size of 95 kDa or less.

5. The process according to claim 1 wherein the shell formed is a chitosan polyurea, having a chitosan content of at least 21 wt % based on the weight of the shell.

6. The process according to claim 1 wherein the population of microcapsules comprises an aqueous slurry having residual hydrolyzed chitosan in the slurry.

7. The process according to claim 6 wherein the aqueous slurry is spray dried, forming microcapsules overcoated with a layer of residual hydrolyzed chitosan deposited onto the microcapsules from the slurry.

8. The process according to claim 1 wherein the ratio of hydrolyzed chitosan in the water phase as compared to the isocyanate in the oil phase is, based on weight, from 21:79 to 90:10, or even from 1:2 to 10:1, or even from 1:1 to 7:1.

9. The process according to claim 1 wherein the polyisocyanate is selected from the group consisting of a polyisocyanurate of toluene diisocyanate, a trimethylol propane adduct of toluene diisocyanate and a trimethylol propane adduct of xylylene diisocyanate, methylene diphenyl isocyanate, toluene diisocyanate, tetramethylxylidene diisocyanate, naphthalene-1,5-diisocyanate, and phenylene diisocyanate.

10. The process according to claim 1 wherein the microcapsules are dried, and fracture upon drying, thereby releasing the core.

11. A composition comprising a core-shell microcapsule, the core comprising a benefit agent, the shell comprising a polyurea resin comprising the reaction product of a polyisocyanate and a chitosan, wherein the chitosan is first hydrolyzed in an acidic medium at a pH of from 3 to 6.5 and a temperature of at least 60° C. for at least one hour;
wherein at least 21 wt % of the shell is comprised of moieties derived from the hydrolyzed chitosan;
wherein the shell degrades at least 40% in at least 14 days when tested according to test method OECD 301B.

12. The composition according to claim 11 wherein the microcapsules rupture upon drying, releasing the benefit agent.

13. The composition according to claim 11 wherein the ratio of the polyisocyanate to hydrolyzed chitosan, based on weight, is 79:21 to 10:90, or even 2:1 to 1:10, or even 1:1 to 1:7.

14. The composition according to claim 11, the shell comprising 1 to 15 percent by weight of the core-shell microcapsule.

15. The composition according to claim 11 wherein the polyisocyanate is selected from the group consisting of a polyisocyanurate of toluene diisocyanate, a trimethylol propane adduct of toluene diisocyanate, a trimethylol propane adduct of xylylene diisocyanate, methylene diphenyl isocyanate, toluene diisocyanate, tetramethylxylidene diisocyanate, naphthalene-1,5-diisocyanate, and phenylene diisocyanate.

16. The composition according to claim 15 wherein the shell degrades at least 50% after at least 20 days when tested according to test method OECD 301B.

17. The composition according to claim 11 wherein the chitosan has a degree of deacetylation of at least 50%.

18. The composition according to claim 11 wherein the core-shell microcapsule has a ratio of core to shell up to 99:1, or even 99.5:1, on the basis of weight.

19. The composition according to claim 11 wherein the benefit agent is selected from the group consisting of perfume, fragrance, agricultural active, phase change material, essential oil, lubricant, colorant, preservative, antimicrobial active, antifungal active, herbicide, antiviral active, antiseptic active, antioxidant, biological active, deodorant, emollient, humectant, exfoliant, ultraviolet absorbing agent, corrosion inhibitor, silicone oil, wax, bleach particle, fabric conditioner, malodor reducing agent, dye, optical brightener, antiperspirant active and mixture thereof.

20. The composition according to claim 11 wherein the core-shell microcapsules have a mean particle size of from 1 to 100 microns.

21. The composition according to claim 11 wherein the microcapsule is cationic.

22. The composition according to claim 11 wherein the microcapsule has a zeta potential of at least 15 mV at a pH of 4.5.

23. The composition according to claim 15 wherein the shell degrades at least 60% of its mass after at least 28 days when tested according to test method OECD 301B.

* * * * *